M. CZINER.
Apparatus for Collecting Alcoholic Vapors in Water.
No. 225,349. Patented Mar. 9, 1880.
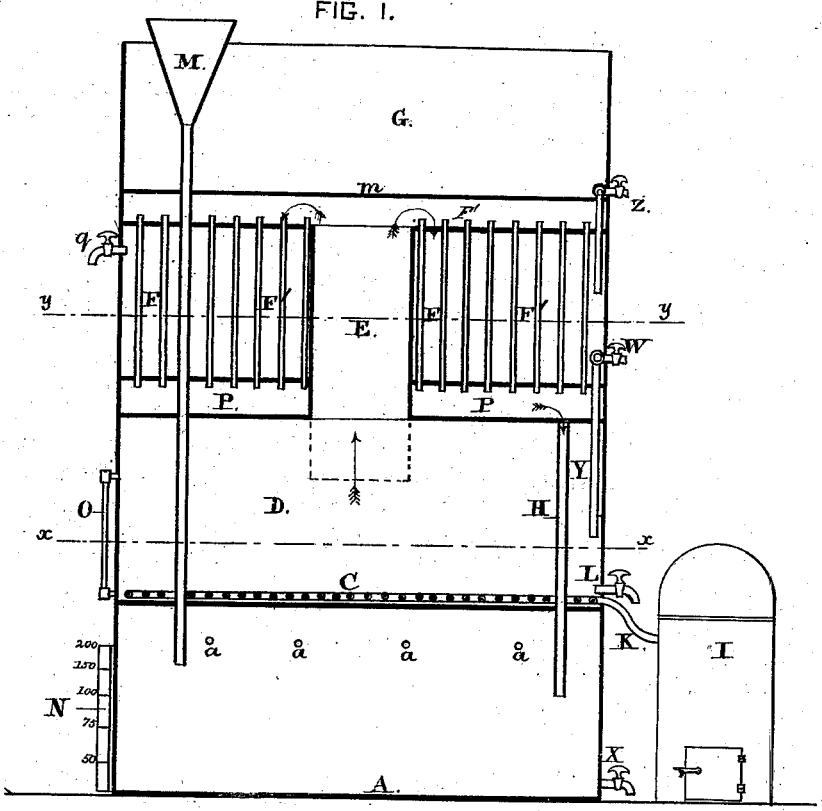
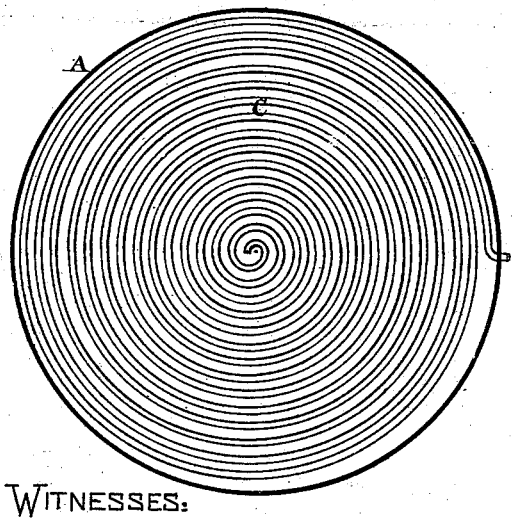
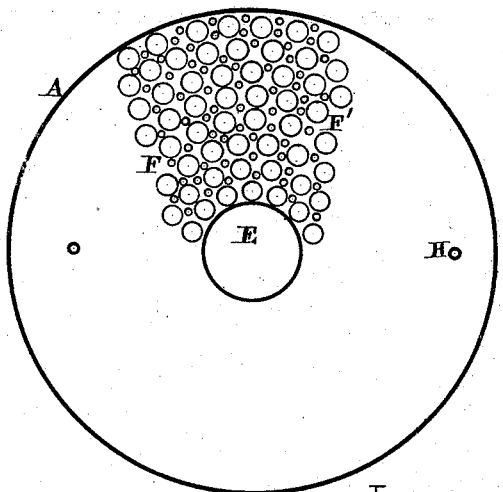
WITNESSES:
INVENTOR:

UNITED STATES PATENT OFFICE.

MATYAS CZINER, OF NEW YORK, N. Y.

APPARATUS FOR COLLECTING ALCOHOLIC VAPORS IN WATER.

SPECIFICATION forming part of Letters Patent No. 225,349, dated March 9, 1880.

Application filed February 6, 1880.

*To all whom it may concern:*

Be it known that I, MATYAS CZINER, of the city, county, and State of New York, have invented certain new and useful Improvements in Apparatus for Collecting Alcoholic Vapors in Water, of which the following is the specification, reference being had to the accompanying drawings, in which—

Figure I represents a vertical sectional view of the apparatus. Fig. II represents the steam-pipe within the vaporator on line $x$ $x$ of Fig. I. Fig. III represents a top view of the tubular compartment on line $y$ $y$ of Fig. I.

The invention relates to that class of vaporizing apparatus in which alcoholic vapors are driven from any mash, said apparatus containing neither a worm, goose-neck, nor similar contrivance; and it consists in an apparatus by means of which perfectly pure alcoholic vapor can be extracted from the mash, which, by solution in water, will produce a transparent and pure fluid for making vinegar.

A is the water-tank into which the vapors from the vaporizing-compartment are driven, as will hereinafter be described. D is the vaporizer. P is the vapor-collector, and H the pipe for the passage of the vapors into the water-tank A.

F′ is a compartment containing spaces and tubes F, through which the vapors pass into the vapor-collector P. Said compartment F′ is closed at both ends, tubes F only projecting through the covers.

G is the mash-tub, and is separated from compartment F′ by a partition, $m$.

M is a funnel for filling the water-tank A with water.

Z represents a pipe provided with a cock for passing the mash from the mash-tub into compartment F′, and Y is a tube having cock W for passing the mash farther down into the vaporizer D.

O represents a glass tube through which the quantity of mash in the vaporizer may be seen.

N represents a gaged tube, the object being to observe the quantity of water pumped into the water-tank proportioned to the amount of mash in the vaporizer D.

E is a central tube passing through compartment F′, through which the vapors arising in the vaporizer pass into the small tubes F.

C is the steam-pipe connected with the boiler, by means of which heat is transmitted into the vaporizer for boiling the mash.

$a'$ are air-holes for the admission of air, and for regulating the temperature in the water-tank. Q is an air-vent.

L is the outlet for the residue of the mash after the alcoholic vapor has been extracted.

The operation is as follows: The mash is pumped into the mash-tub G. The cock Z is opened and the mash let into the compartment F′, from whence it passes through pipe Y into the vaporizer D, where it is boiled and the vapors separated or driven therefrom. As soon as the vaporizer is filled to its proper capacity the cock W is closed and the vessel F′ is again filled with mash, when cock Z is closed and the operation of filling the mash-tubs G with mash repeated. Then the required quantity of water is pumped into the funnel M and chamber A, where the vapors are absorbed. As soon as the several compartments are filled with mash and water, respectively, steam is admitted from the boiler and into pipe C, by means of which the mash is boiled and the vapors driven therefrom.

In the process of separating the alcoholic vapors from the mash the vapors pass from the vaporizer D through the central tube, E, and through tubes F into the vapor-collector P, and through pipe H into the water in the tank A.

Having thus described my invention, I claim—

1. The vaporizer A, embracing in its construction the water-tank B, upon which rests the vaporizer D, vapor-collector P, tubular compartment F, and mash-tub G, the whole forming one structure, substantially as shown and described.

2. The combination of the water-tank B, mash-tub G, tubular compartment F, the pipes for conducting vapor, mash, and water to their respective compartments, and the pipe within the vaporizer, which is connected with the steam-generator, the whole constructed as and for the purpose set forth.

MATYAS CZINER.

Witnesses:
D. P. COWL,
LEVI BACON.